L. HEUSNER.
LACTOMETER.
No. 190,587. Patented May 8, 1877.
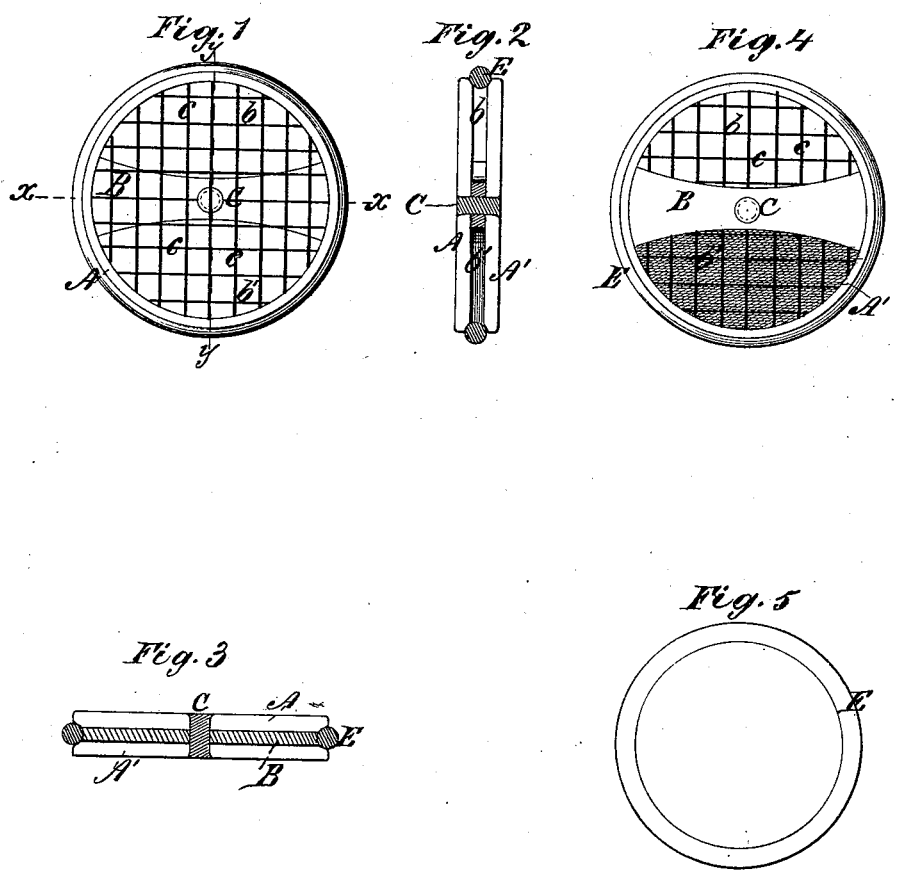

UNITED STATES PATENT OFFICE.

LOUIS HEUSNER, OF BARMEN, PRUSSIA.

IMPROVEMENT IN LACTOMETERS.

Specification forming part of Letters Patent No. 190,587, dated May 8, 1877; application filed February 17, 1877.

*To all whom it may concern:*

Be it known that I, Dr. LOUIS HEUSNER, of Barmen, in the Kingdom of Prussia, have invented an Improved Lactometer, which may also be applied to testing the strength and purity, and to detecting impurities in other alimentary and medicinal liquids; and I do hereby declare that the following is a full, clear, and exact description of the same, reference being had to the accompanying drawing, forming part of this specification.

My invention is designed to furnish a convenient instrument for determining the natural richness of milk, which, as is well known, varies greatly in quality as obtained from different animals, to determine the adulteration of milk by water or other substance added thereto for fraudulent purposes, to indicate a deterioration in the quality of milk by the extraction therefrom of a portion or the whole of its cream, and also to determine in other liquids the addition of adulterations or diluents thereto, or the extraction of ingredients therefrom, or the removal of constituents thereof.

The invention consists in parallel transparent plates, attached together in such manner as to leave a parallel-sided space between them, a portion of said space being set off by a partition, or otherwise, to hold the liquid to be tested, and another portion of the instrument being filled, or provided for filling, with a substance having the normal color, transparency, or translucency of the substance to be tested, or having the transparent plates composing it tinted and rendered translucent, if necessary, to imitate said normal color, transparency, or translucency of the substance to be tested, and one side of the instrument being provided with lines, letters, or other objects to be viewed through the instrument, in such manner that when the space for the reception of the liquid to be tested is filled with said liquid, and the instrument is held to the light with the said lines, letters, or figures on the side opposite to the side presented to the eye, any variation from the normal tint, transparency, or translucency will be apparent on comparison of the same with the like qualities in that part of the instrument indicating the normal standard of such qualities, said instrument being also provided with a stopper for closing the chambers between the plates.

Figure 1 in the drawing is a side view of the instrument. Fig. 2 is a vertical section on the line $y\,y$ in Fig. 1. Fig. 3 is a horizontal cross-section on the line $x\,x$ in Fig. 1. Fig. 4 is a view showing the side of the instrument opposite that side shown in Fig. 1. Fig. 5 is a detail view of a stopper used with the instrument for excluding dirt therefrom, or for holding the liquid to be tested within the instrument when in use.

A and A' represent two plates of a glass or other transparent material, made preferably, but not necessarily, circular in form, attached together by a rivet, C, at their centers, or connected in any other suitable manner, and having their inner surfaces separated by a partition or plate, B, of any suitable material, of a different color from the liquid to be tested, and preferably opaque.

Said plate or partition divides the space between the said plates A A' into chambers $b\,b'$, the chamber $b$ being left vacant for the reception of milk or other liquid to be tested, and the chamber $b'$, when in use, being permanently or temporarily filled with any suitable substance possessing the normal tint, translucency, or transparency of the liquid to be tested.

The chamber $b'$ may either be permanently filled with some solidified substance possessing the desired qualities, or the instrument may be made, as hereinafter described, to receive in the chamber $b'$ a standard quality of any liquid, to be used in comparison with a sample of liquid of the same kind to be tested. In this form the instrument is adapted to general use for testing the qualities of different kinds of liquids. When the chamber $b'$ is permanently filled the instrument is only adapted to testing one kind of liquid, or such liquids as correspond in tint, transparency, or translucency to the filling of the chamber $b'$.

The plate A' is provided with lines $c$, letters, words, numerals, or other devices formed in or on said plate in any suitable manner, which, in the use of the instrument, as hereinafter set forth, are viewed through the plate A, and the liquid to be tested contained in the space $b$ between said plates.

An elastic ring-stopper, E, (shown in Fig. 5,) is employed to close the chambers $b\ b'$ between the transparent plates A A′. Said stopper is, in use, stretched around the circumference of the instrument, and allowed by its elasticity to press down between the inner edges of the said plates.

When the chamber $b'$ is left vacant to be filled at pleasure with any standard liquid for the purpose of testing a sample of liquid of the same kind placed in the chamber $b$, an intermediate plate may be employed between the plates A A′, separated from said plates by partitions B, leaving parallel-sided chambers between said plates and the intermediate plate. In this case the chamber $b'$ between the plate A and the intermediate plate may first be filled with pure liquid of the kind to be tested, and stopped by the ring-stopper. Then the space $b$ between the intermediate plate and the plate A′ may be filled with the liquid to be tested, and stopped with another ring-stopper.

The instrument is used by filling the space or chamber $b$ with the liquid to be tested. It is then wiped clean, and held between the eye and a source of light, the lines in or on the plate A′ being on the side away from the eye. The lines $c$ should, if the liquid in the chamber $b$ has the purity and density indicated by the standard substance in the chamber $b'$, show equally plain through the walls of both chambers and the substances contained therein, and the tints of the said contained substances should be the same. Any difference in the conspicuity of the lines or in the tints of the substances in the chambers indicates corresponding excess or deficiency in ingredients above or below the normal standard, or the presence of adulterations.

The apparatus, as described, may be used for testing the density and purity of all alimentary liquids, wines, beer, &c., or liquids used as medicines, and which are subject to adulteration.

I claim—

1. The combination of the transparent attached plates A A′, the plate A′ having in or on it lines or figures $c$, and a partition, B, dividing the space between said plates into chambers, the one for holding the liquid to be tested, and the other for holding the standard substance with which said liquid is to be compared, substantially as and for the purpose specified.

2. The combination of the attached transparent plates A A′, the partition B, dividing the space between said plates into chambers $b\ b'$, and the permanent filling contained in the chamber $b'$, substantially as and for the purpose specified.

3. The combination, with the plates A A′, separated by the partition B, of the ring-stopper E, for closing said chambers, substantially as and for the purpose set forth.

DR. LOUIS HEUSNER.

Witnesses:
ALBERT OSTERMANN,
HEINR. PLATZHOFF.